United States Patent [19]

Andersen

[11] 4,138,141
[45] Feb. 6, 1979

[54] FORCE ABSORBING DEVICE AND FORCE TRANSMISSION DEVICE

[75] Inventor: George L. Andersen, Columbus, Ohio

[73] Assignee: General Signal Corporation, Rochester, N.Y.

[21] Appl. No.: 771,139

[22] Filed: Feb. 23, 1977

[51] Int. Cl.² .................... B60G 19/00; B60G 21/00
[52] U.S. Cl. ............................... 280/689; 403/206; 403/345
[58] Field of Search ............ 403/206, 209, 213, 282, 403/345; 29/445; 280/689

[56] References Cited

U.S. PATENT DOCUMENTS

| 124,013 | 2/1872 | Saladee | 267/57 |
|---|---|---|---|
| 1,823,158 | 9/1931 | Mogford et al. | 301/124 R |
| 1,903,436 | 4/1933 | Brown | 72/369 |
| 1,911,311 | 5/1933 | Ernst | 285/114 |
| 2,131,766 | 10/1938 | Temple, Jr. | 29/148 |
| 2,595,695 | 5/1952 | Packer et al. | 29/445 |
| 2,774,384 | 12/1956 | Wallace | 138/69 |
| 3,033,555 | 5/1962 | Stoll | 267/57 |
| 3,172,541 | 3/1965 | Hiser | 403/209 |
| 3,315,982 | 4/1967 | Svendsen | 280/124 |
| 3,453,857 | 7/1969 | Reckard | 72/357 |

Primary Examiner—Richard A. Bertsch
Attorney, Agent, or Firm—Jeffrey S. Mednick

[57] ABSTRACT

A force absorbing device and a force transmission device are provided including at least one member having a tubular configuration. A second member extends into one end of the tubular member and engages it in an interference fit to form a permanent joint. The tubular member and the second member have complementary bends at the permanent joint. The force absorbing device may include one or two such permanent joints. In the force transmission device, two such permanent joints are provided. The joints are made by cutting a tubular member to a desired length, press fitting a portion of a second member into one end of the tubular member to form a reinforced zone, and bending the second member and the tubular member at the reinforced zone to form the complementary bends and the permanent joint.

3 Claims, 14 Drawing Figures

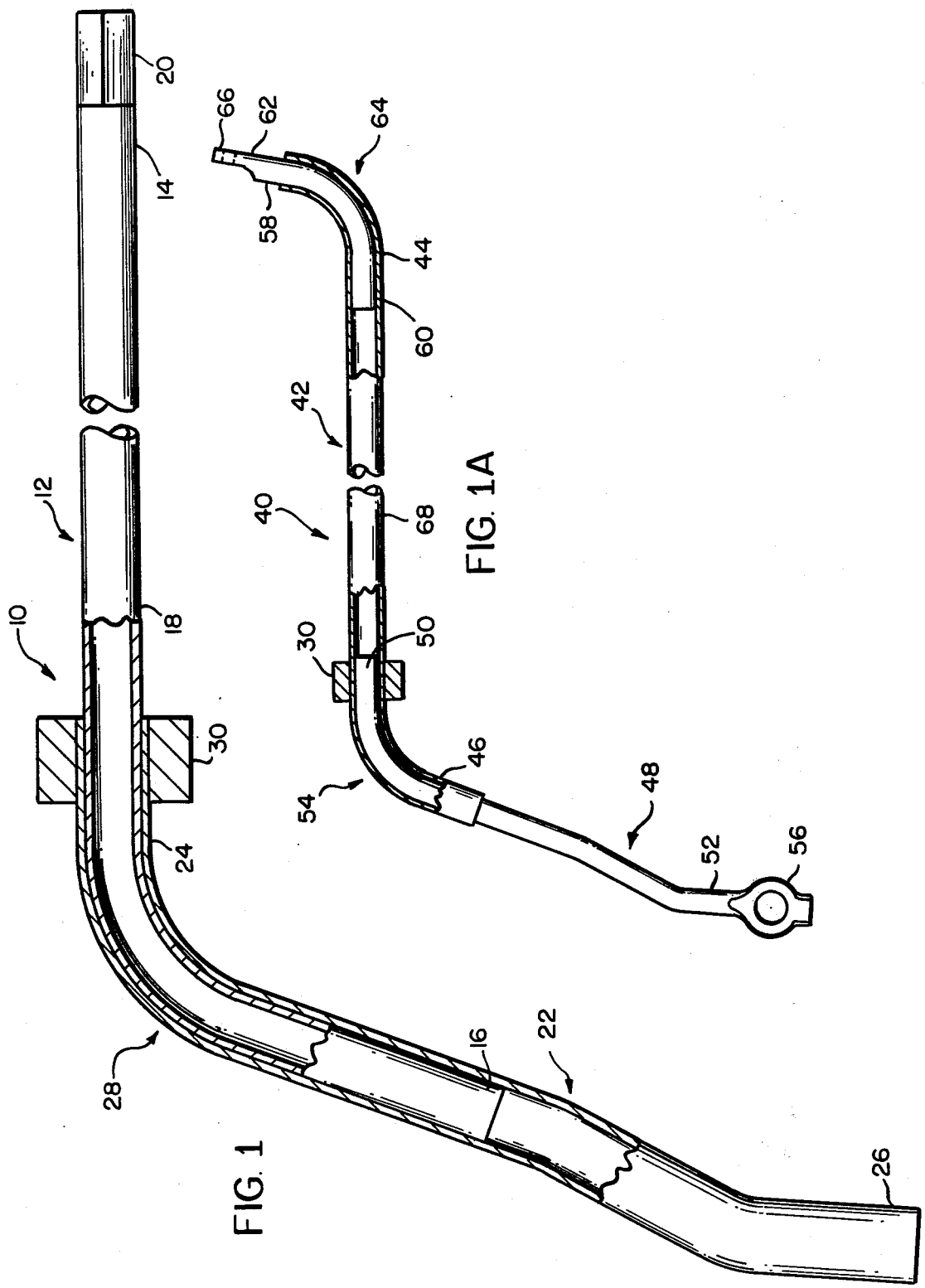

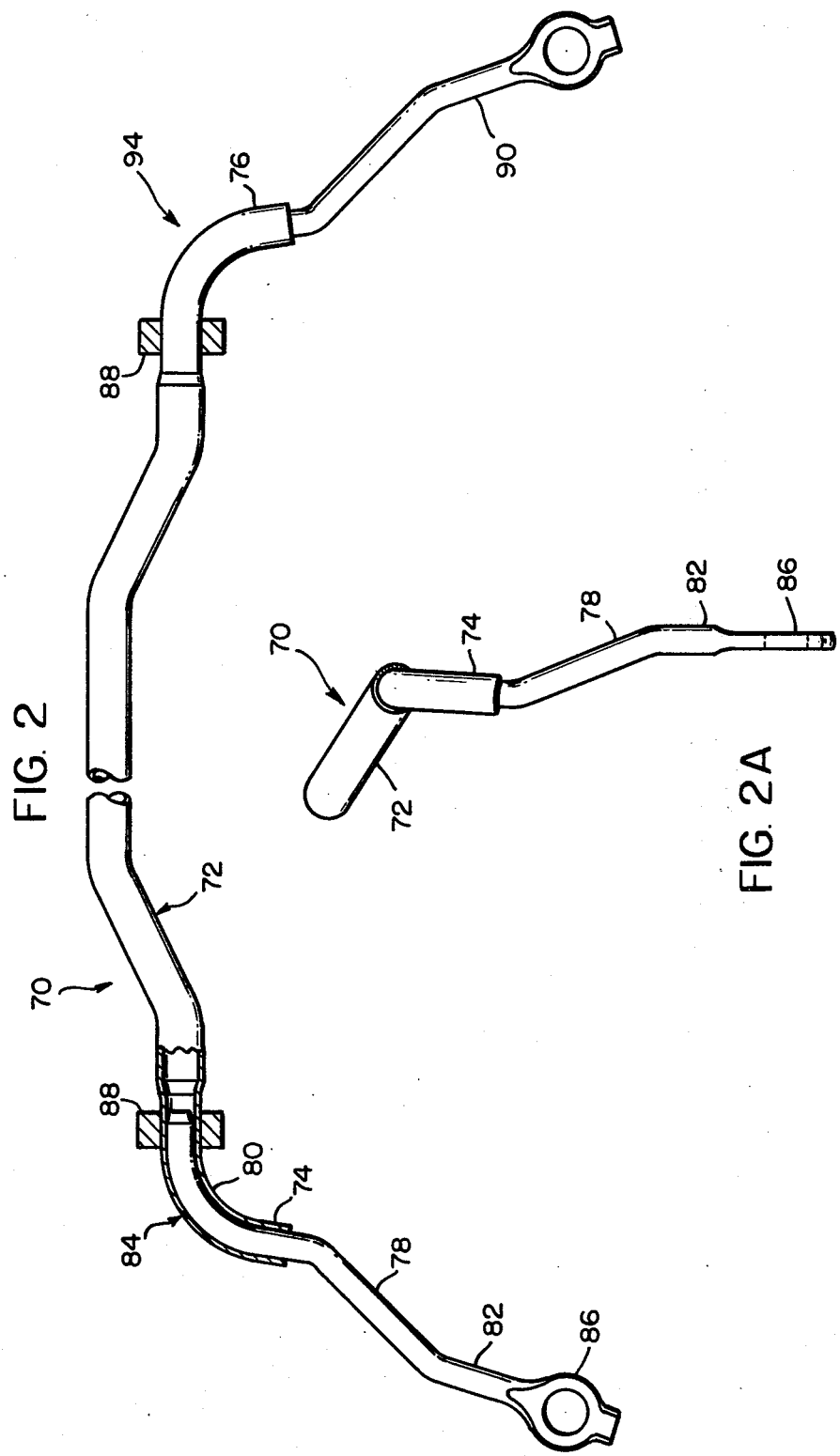

FORCE ABSORBING DEVICE AND FORCE TRANSMISSION DEVICE

BACKGROUND OF THE INVENTION

The present invention relates generally to novel joints and devices employing members having a tubular configuration and more particularly to novel automotive suspension and support devices, such as anti-sway bars, torsion bars, and the like.

In automotive suspension and support systems, such components as anti-sway bars and torsion bars have been made from solid cylindrical metal stock. Typically, such stock would vary in diameter from ⅝ inch to 1¼ inch depending on the weight of the automobile and the particular ride characteristics desired. One problem with this prior construction is that components are typically quite heavy. For example, an anti-sway bar, sometimes referred to as a stabilizer bar, having a one inch diameter and a forty-two inch bushing to bushing length would weigh more than nine pounds. Typically, such anti-sway bars include one or more bends, as illustrated in U.S. Pat. No. 3,315,952. Although it is known that tubular material weights less than solid material, and although techniques for bending tubular material are also well-known, as illustrated in U.S. Pat. No. 1,903,436, to data no technique has been utilized successfully for making such anti-sway bars or torsion bars out of tubular material. The reason for this is that it is a characteristic of tubular material that once it is bent it is drastically weakened in the transition area. Thus, if the tubing is utilized in an application such as an anti-sway bar where a large amount of stress will be placed upon it, the tubing will tend to buckle and fail catastrophically in the transition area.

SUMMARY OF THE INVENTION

Accordingly, a force absorbing device and a force transmission device have been provided including at least one member having a tubular configuration. A second member extends into one end of the tubular member and engages it in an interference fit to form a permanent joint. The tubular member and the second member have complementary bends at the permanent joint. The force absorbing device may include one or two such permanent joints. In the force transmission device, two such permanent joints are provided. The joints are made by cutting a tubular member to a desired length, press fitting a portion of a second member into one end of the tubular member to form a reinforced zone, and bending the second member and the tubular member at the reinforced zone to form the complementary bends and the permanent joint.

OBJECTS OF THE PRESENT INVENTION

An object of the present invention is the provision of force absorbing and force transmitting devices which are lighter in weight than those heretofore available.

A further object of the present invention is the provision of light weight force absorbing and force transmitting devices having performance characteristics which are nearly identical to those of heavier devices.

Another object of the present invention is the provision of a novel joint construction enabling the use of tubular material in applications requiring bends under stress.

A further object of the present invention is the provision of a method of making force absorbing and force transmitting device from tubular material.

A still further object of the present invention is the provision of a method of joining tubular material to another member.

Another object of the present invention is the provision of a method of making force absorbing and force transmitting devices which is both simple and inexpensive.

Other objects, advantages, and novel features of the present invention will become apparent from the following detailed description of the invention when considered in conjunction with the accompanying drawings.

BRIEF DESCRIPTION OF THE DRAWINGS

FIG. 1 shows a force absorbing device of the present invention.

FIG. 1A shows a modification of the device shown in FIG. 1.

FIGS. 2 and 2A show a force transmission device of the present invention.

DESCRIPTION OF THE PREFERRED EMBODIMENTS

Figure 3A:
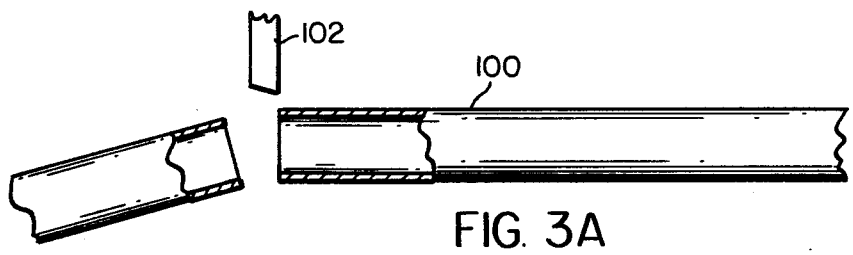
FIGS. 3A through 3E illustrate a method of making one embodiment of the present invention.

FIG. 1 illustrates a preferred embodiment of a force absorbing device of the present invention. FIG. 1 shows a torsion bar generally shown at 10 including a first member 12 having a tubular configuration. The tubular member 12 includes end portions 14 and 16 and main body portion 18 between ends 14 and 16. The end portion 14 includes an attachment means, illustrated as a hexagonal fitting 20. The torsion bar 10 further includes a second tubular member 22 having end portions 24 and 26. The end portion 24 of tubular member 22 engages the end portion 16 of tubular member 12 in an interference fit, so that a permanent joint 28 exists between tubular members 12 and 22. Although tubular member 12 is shown as extending into the interior of tubular member 22, it is to be understood that it is within the scope of the invention to reverse the positions of these members so that tubular member 22 would extend into the interior of tubular member 12. The tubular members 12 and 22 include complementary bends at the permanent joint 28.

The torsion bar 10 is affixed to the frame of an automobile in a conventional manner by means of bushing 30 on the frame of the automobile. The torsion bar 10 is preferably held by the bushing 30 in the doubled, and therefore reinforced, zone of the bar. Likewise, the hexagonal fitting 20 is adapted to mate with a corresponding fitting on the automobile frame. The end 26 of the tubular member 22 also includes an attachment means (not shown) which permits end 26 to be affixed to the automobile suspension system. For example, the end 26 of tube 22 may be flattened and drilled to include a mounting hole. The tubular members 12 and 22 could be made from a variety of materials but are preferably made from manganese steel alloys.

FIG. 1A illustrates a second embodiment of a force absorbing device of the present invention. A torsion bar 40 includes a tubular member 42 having end portions 44 and 46. A second member, preferably in the form of a solid steel bar 48, includes end portions 50 and 52. End portion 50 of steel bar 48 extends into end portion 46 of tubular member 42 and engages end portion 46 in an interference fit. Thus, a permanent joint 54 exists between bar 48 and tubular member 42. The bar 48 and the tubular member 42 include complementary bends at the permanent joint 54. End portion 52 of bar 48 includes an attachment means which is illustrated as an eyelet 56. The eyelet 56 is adapted to be fastened to an automobile suspension system.

The torsion bar 40 further includes an attachment means on the end 44 of tubular member 42 for anchoring the torsion bar to the frame of an automobile. In this embodiment the attachment means includes a solid steel bar 58 having ends 60 and 62. End 60 of bar 58 extends into end 44 of tubular member 42 and engages end 44 in an interference fit. Thus, a permanent joint 64 exists between bar 58 and tubular member 52. The bar 58 and tubular member 42 further include complementary bends at permanent joint 64. The end 62 of bar 58 is preferably flattened and includes an eyelet 66 for attaching bar 58 to the frame of an automobile. The torsion bar 40 is further anchored to the automobile frame by means of bushing 30, as discussed in connection with the torsion bar shown in FIG. 1. Although tubular member 42 is illustrated as having constant inside and outside diameters, it is within the scope of the present invention to either increase or decrease the diameter of tubular member 42 to alter the performance characteristics of the torsion bar 40. Thus, the main body portion 68 of the tube 42 may have one set of inside and outside diameters and the ends 44 and 46 may have a second set of inside and outside diameters.

To illustrate the increased weight effectiveness, i.e. performance per unit weight of the torsion bars embodying the principles of the present invention, consider the following example. A torsionbar built in accordance with the principles of the prior art employed solid metal stock varying in outside diameter from 1.05 inches to 1.285 inches and weighed 15.2 pounds. On the other hand, a torsion bar such as that illustrated in FIG. 1 had a first tube with an inside diameter of 1.2 inches and an outside diameter of 1.4 inches and a second tube having an inside diameter of 1.4 inches and an outside diameter of 1.6 inches. This torsion bar exhibited nearly identical performance characteristics to that of the prior art torsion bar but weighed only 7.9 pounds, a savings of 7.3 pounds or nearly 50 percent.

FIG. 2 illustrates a force transmission device of the present invention and FIG. 2A is an end view of the device shown in FIG. 2. The force transmission device is illustrated as an anti-sway bar 70 including a tubular member 72 having end portions 74 and 76. A member 78, preferably in the form of a solid steel bar, includes ends 80 and 82. End 80 of solid member 78 extends into end 74 of tubular member 72 and engages tubular member 72 in an interference fit. Thus, a permanent joint 84 exists between tubular member 72 and solid member 78. Solid member 78 and tubular member 72 include complementary bends at joint 84. The member 78 includes attachment means 86 at end 82. The attachment means 86 is preferably a flattened portion on the end 82 including a mounting hole adapted to be affixed to an automobile suspension system. The anti-sway bar assembly 70 is secured to an automobile frame by means of a pair of bushings 88 on the automobile frame.

A second solid member 90 identical to the member 78 is joined to end 76 of tubular member 72 in the same manner as that discussed above. As is most clearly seen in FIG. 2A the end portions 74 and 76 of tubular member 72 preferably have a reduced outside and inside diameter with respect to the main body portion 92. This reduction in inside diameter is designed to keep the size of solid member 78 and 90 to a minimum while retaining the desired performance characteristics of the anti-sway bar. It should be understood that it is within the scope of the present invention for the members 78 and 90 to be tubular instead of solid. In this case the joints 84 and 94 would be similar to structure to the joint 28, shown in FIG. 1.

Thus it is apparent that in accordance with the principles of the present invention, a new anti-sway bar has been provided which retains the performance characteristics of prior anti-sway bars but at the same time greatly reduces the weight of the bar. For example, an anti-sway bar constructed in accordance with the principles of the prior art and made from a solid bar having a one inch diameter and a forty-two inch bushing to bushing length would weigh about 9.34 pounds. However, an anti-sway bar constructed in accordance with the principles shown in FIGS. 2 and 2A and having an outside tube diameter of 1.2 inches and an inside tube diameter of 1 inch would slightly outperform prior anti-sway bars but would weigh only 4.1 pounds. This amounts to a weight reduction of 5.24 pounds or more than 56 percent.

Figure 3B:
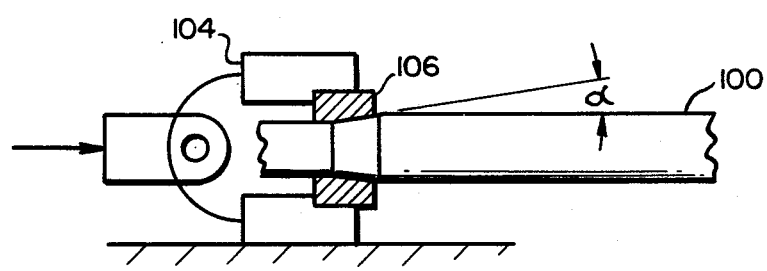
Figure 3C:
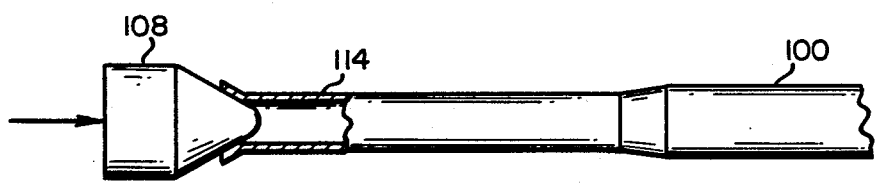
Figure 3D:
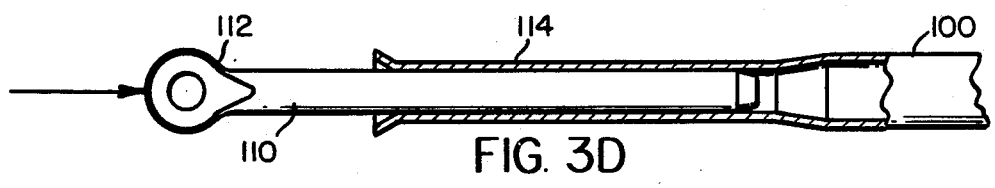
Figure 3E:
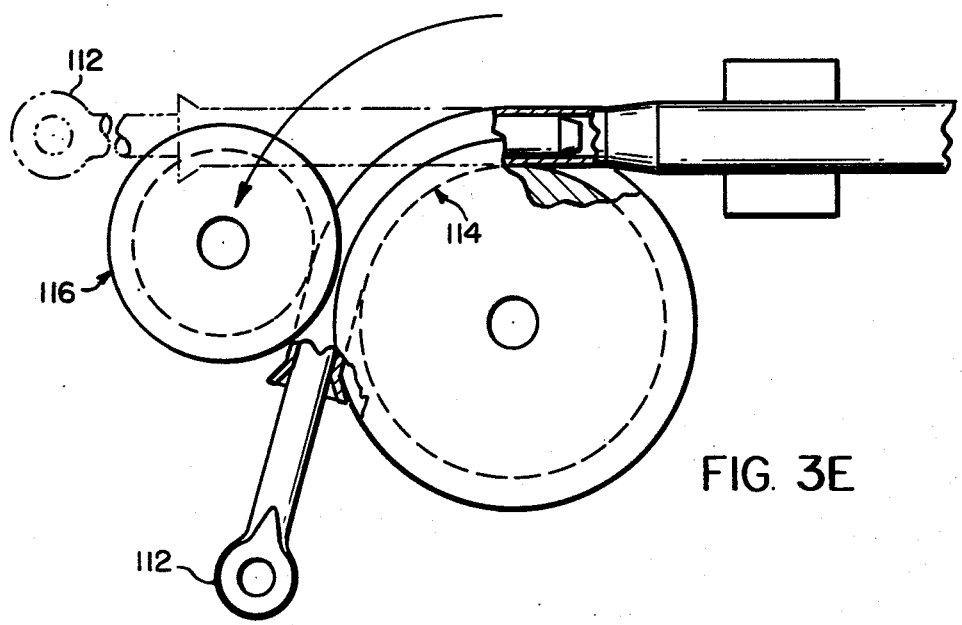

Referring now to the schematic illustrations of FIGS. 3A through 3E, a method of making a preferred joint in accordance with the principles of the present invention will be described in detail. A tube 100 is first cut to proper length as shown in FIG. 3A by a cutting tool 102. Any suitable cutting means will suffice such as shearing or turning means. Should the end of the tube require a reduction in inside diameter, it is run through an extruder 104, as shown in FIG. 3B. The jaws of the extruder 104 are set at an angle $\alpha$ preferably between 8 degrees and 12 degrees. It may further be desirable to flare the ends of the tube 100 before press fitting a member into the end of the tube. This is illustrated in FIG. 3C by forcing a tapered die 108 into the end of the tube 100. A solid member 110 is cut to a desired length and an attachment means 112 is formed on one end thereof in accordance with known methods. The solid member 110 is then press fitted into the reduced end portion of tube 100, preferably by suitable hydraulic means, as shown in FIG. 3D. This press fitting operation creates a reinforced zone 114 in the doubled area occupied by both the tube 100 and the solid member 110. The members 110 and 100 are then bent at the reinforced zone 114, as shown in FIG. 3E. This is preferably accomplished by means of a known rocking die assembly 116. When press fitting the member 110 into the member 100, it is important to maintain a snug interference fit to create significant hoop tensile stresses in the tube 100. Of course, it is apparent how this method can be utilized to form the force absorbing and force transmitting devices of the present invention, as illustrated in FIGS. 1 and 2. For example, the force absorbing device of FIG. 1 would require only a single such joint, whereas the force absorbing device shown in FIG. 1A would require two such joints. The force transmission device shown in FIG. 2 would also require two such joints. It should further be apparent that tubular members only may be utilized to form the joints of the present invention, as illustrated in FIG. 1. In this case especially, the reduction step illustrated in FIG. 3B may be eliminated.

Figure 4A:
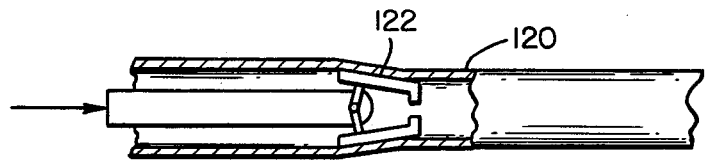
FIGS. 4A through 4E illustrate a method of making a second embodiment of the present invention.
Figure 4B:
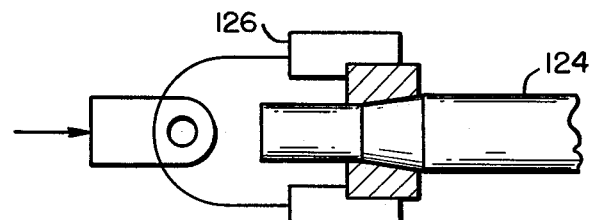
Figure 4C:
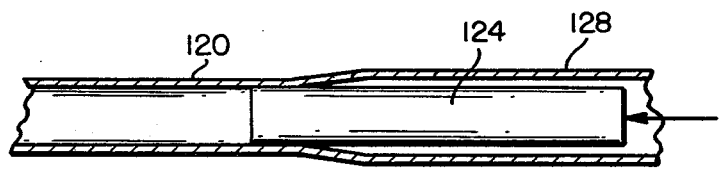
Figure 4D:
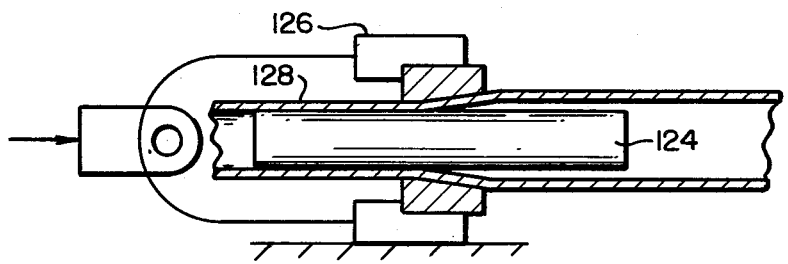
Figure 4E:
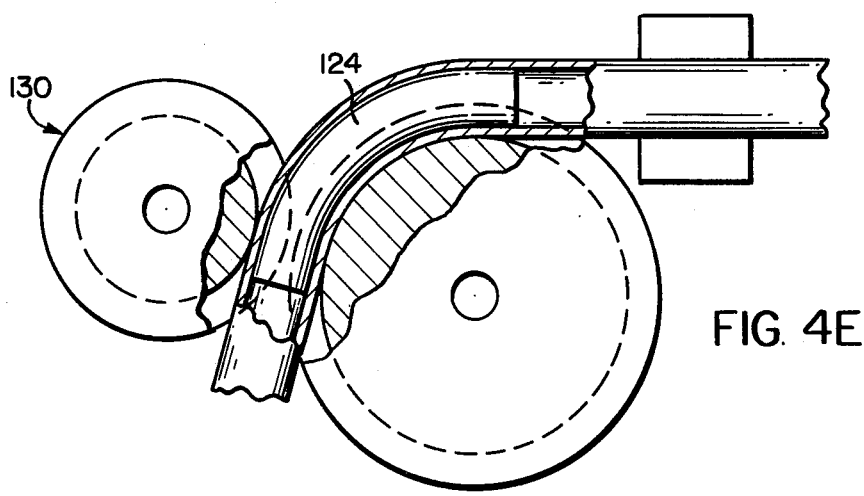

A method of forming a second embodiment of the present invention is illustrated schematically in FIGS. 4A through 4D. Here a tubular member 120 may be cut to any desired length as illustrated in FIG. 3A. The internal diameter of the tube 120 is then increased in diameter by means of extruder jaws 122. Once again, an 8 degree to 12 degree taper on the extruder jaws 122 is preferred. A slug of metal 124 is extruded to a desired outside diameter by an extruder 126, as illustrated in FIG. 4B. The slug 124 is reduced to an outside diameter sufficient to achieve an interference fit with the inside diameter of the unreduced portion of tube 120. As shown in FIG. 4C the slug 124 is then inserted into the widened end of tube 120 until it engages the interior of the body portion of the tube 120. At this point, the slug 124 is press fitted, preferably by suitable hydraulic means into the body portion of the tube 120 to form a reinforced zone 128. The widened portion of tube 120 is then reduced to a desired internal diameter by means of extruder 126, as shown in FIG. 4D. The tube 120 and the slug 124 are then bent at the reinforced zone 128, as shown in FIG. 4E. This is accomplished by means of a known rocking die 130. This alternate method of bending tubular members can be utilized quite effectively in making the force absorbing and force transmitting devices of the present invention. Thus, the torsion bars and anti-sway bars made by this method would contain a continuous tubular member reinforced at the bends by press fitted slugs of material.

Thus, in accordance with the principles of the present invention, novel force absorbing and force transmitting devices are provided which are considerably lighter in weight than those heretofore available. Furthermore, this reduction in weight is accomplished at no sacrifice in the performance characteristics of these force absorbing and force transmitting devices. This greater weight effectiveness is accomplished since the present invention utilizes joint and bend constructions which permit the use of tubular material where heretofore solid material was required. Additionally, the methods employed by the present invention utilize relatively simple and inexpensive manufacturing techniques. This is contrasted with the manufacturing techniques required for making solid torsion and anti-sway bars which required expensive heat treating of stock steel.

While there have been described what are at present considered to be the preferred embodiments of the present invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A force absorbing device comprising:
   a first member having a tubular configuration and having first and second ends, said first end of said first member including an attachment means;
   a second member having first and second ends, said first end of said second member extending into said second end of said first member, and said first end of said second member engaging said second end of said first member in an interference fit to form a permanent joint therebetween;
   said first member and said second member having complementary bends at said permanent joint;
   said force absorbing device being a torsion bar adapted to be utilized in an automobile suspension system; and
   said attachment means on said first end of said first member being a hexagonal fitting formed on the outside of said first member.

2. A force transmission device comprising:
   a first member having a tubular configuration and having first and second ends;
   a second member having first and second ends, and said first end of said second member engaging said first end of said first member in an interference fit to form a first permanent joint therebetween;
   said first member and said second member having complementary bends at said first permanent joint;
   a third member having first and second ends, and said first end of said third member engaging said second end of said first member in an interference fit to form a second permanent joint therebetween;
   said first member and said third member having complementary bends at said second permanent joint;
   said second end of said second member and said second end of said third member each including an attachment means;
   said force transmission device being a sway bar adapted to be fastened to a frame of an automobile; and
   said attachment means being adapted to be linked to a suspension system of said automobile.

3. A force absorbing device comprising:
   a first member having a tubular configuration and having first and second ends, said first end of said first member including an attachment means;
   a second member having first and second ends, said first end of said second member extending into said second end of said first member, and said first end of said second member engaging said second end of said first member in an interference fit to form a permanent joint therebetween; and
   said first member and said second member having complementary bends at said permanent joint;
   said force absorbing device being a torsion bar adapted to be utilized in an automobile suspension system; and
   said attachment means on said first end of said first member including a third member, said third member having a solid cross-section and first and second ends, said first end of said third member extending into said first end of said first member and engaging said first end of said first member in an interference fit to form a second permanent joint therebetween, said first member and second third member having complementary bends at said permanent joint, and said second end of said third member including means for bolting said third member to an automobile frame.

* * * * *